(12) United States Patent
Scheinbart et al.

(10) Patent No.: US 6,601,150 B1
(45) Date of Patent: Jul. 29, 2003

(54) MEMORY MANAGEMENT TECHNIQUE FOR MAINTAINING PACKET ORDER IN A PACKET PROCESSING SYSTEM

(75) Inventors: Marvin Scheinbart, Chelmsford, MA (US); Geoffrey B. Ladwig, Chelmsford, MA (US); Richard Angle, Wellesley, MA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/309,471

(22) Filed: May 10, 1999

(51) Int. Cl.[7] .......................... G06F 12/00; H04L 12/56
(52) U.S. Cl. ...................... 711/156; 370/412; 370/429; 710/55
(58) Field of Search ................................ 711/154, 156; 710/52, 53, 54, 58, 55; 345/558; 370/394, 412, 413, 428, 429

(56) References Cited

U.S. PATENT DOCUMENTS

| | | | |
|---|---|---|---|
| 5,802,055 A | * 9/1998 | Krein et al. | 370/402 |
| 6,067,300 A | * 5/2000 | Baumert | 370/413 |
| 6,101,192 A | * 8/2000 | Wakeland | 370/429 |
| 6,147,996 A | * 11/2000 | Laor et al. | 370/394 |
| 6,282,203 B1 | * 8/2001 | Yeom et al. | 370/413 |
| 6,295,295 B1 | * 9/2001 | Wicklund | 370/392 |

* cited by examiner

Primary Examiner—Gary J Portka
(74) Attorney, Agent, or Firm—John C. Gorecki

(57) ABSTRACT

A memory management technique for maintaining packet order in a packet processing system involves maintaining a START indicator and a VALID indicator for each memory block in a packet memory. Packets are written in a number of successive memory blocks, and the START indicator corresponding to the first memory block of the number of successive memory blocks is set to indicate that the packet is available for processing. The packets are processed by a packet processor. When the packet processor completes the processing of a particular packet, the VALID indicator corresponding to the first memory block associated with that packet is set to indicate that the packet is ready to be forwarded. The packet may become ready to be forwarded out of order. However, the packets are forwarded in first-in-first-out order by processing the packets in first-in-first-out order and only forwarding a particular packet if the VALID indicator corresponding to the first memory block associated with that packet is set to indicate that the packet is ready to be forwarded. Thus, a packet is not forwarded unless and until all previous packets have been forwarded, even if the packet is ready to be forwarded before one or more previous packets.

30 Claims, 10 Drawing Sheets

MEMORY MANAGEMENT TECHNIQUE FOR MAINTAINING PACKET ORDER IN A PACKET PROCESSING SYSTEM

FIELD OF THE INVENTION

The present invention relates generally to communication networks, and, more particularly, to maintaining packet order in a packet processing system in which packets may become available for processing out of order.

BACKGROUND OF THE INVENTION

In today's information age, communication devices, such as computers and computer peripherals, are often internetworked over a data communication network. Within the data communication network, packets of data are processed by a number of interconnected communication controllers, such as Asynchronous Transfer Mode (ATM) communication controllers or Internet routers. A packet received over an ingress interface of the communication controller is routed by the communication controller to an egress interface. Since a typical communication controller supports multiple ingress and egress interfaces, the packet must be processed by a packet processor in order to determine the appropriate egress interface for the packet.

One key differentiator between various communication controllers is packet throughput, which is typically characterized by the number of packets per second that the communication controller can process. The packet throughput of a communication controller is determined by a number of factors, not the least of which is the internal data path architecture of the communication controller. Thus, an internal data path architecture that expedites the processing of packets is valuable, and therefore desirable.

Furthermore, certain data communication network configurations require that the routed packets be forwarded in the same order in which they were received Thus, an internal data path architecture that maintains packet order is valuable, and therefore desirable.

Consequently, an internal data path architecture that expedites the processing of packets while maintaining packet order is valuable, and therefore desirable.

SUMMARY OF THE INVENTION

In accordance with one aspect of the invention, a memory manager coordinates access to a packet memory so that packets are written into the packet memory in first-in-first-out order, processed by a packet processor in an order-independent fashion, and read from the packet memory in first-in-first-out order.

In accordance with another aspect of the invention, the memory manager maintains a START indicator and a VALID indicator for each memory block in the packet memory. Packets are written in a number of successive memory blocks, and the START indicator corresponding to the first memory block of the number of successive memory blocks is set to indicate that the packet is available for processing. The packets are processed by a packet processor. When the packet processor completes the processing of a particular packet, the VALID indicator corresponding to the first memory block associated with that packet is set to indicate that the packet is ready to be forwarded. The packet may become ready to be It forwarded out of order. However, the packets are forwarded in first-in-first-out order by processing the packets in first-in-first-out order and only forwarding a particular packet if the VALID indicator corresponding to the first memory block associated with that packet is set to indicate that the packet is ready to be forwarded. Thus, a packet is not forwarded unless and until all previous packets have been forwarded, even if the packet is ready to be forwarded before one or more previous packets.

In a preferred embodiment of the present invention, the memory manager is operably coupled to coordinate access to the packet memory by a packet writer, a packet processor, and a packet reader. The memory manager includes status indicator memory including a START indicator and a VALID indicator for each of the plurality of memory blocks in the packet memory, packet writer interface logic operably coupled to set the START indicator corresponding to a first memory block associated with each packet stored in the packet memory by the packet writer, packet processor interface logic operably coupled to set the VALID indicator corresponding to a first memory block associated with each packet stored in the packet memory that is ready to be forwarded by the packet processor, and packet reader interface logic operably coupled to monitor the VALID indicator corresponding to a first memory block associated with a first packet to be forwarded and produce an output signal upon detecting that the VALID indicator is set to indicate that said first packet is ready to be forwarded by the packet reader. The memory manager clears the START and VALID indicators when the end of the packet is read from the packet memory.

BRIEF DESCRIPTION OF THE DRAWINGS

The foregoing and other objects and advantages of the invention will be appreciated more fully from the following further description thereof with reference to the accompanying drawings wherein.

DETAILED DESCRIPTION OF A PREFERRED EMBODIMENT

Figure 1:
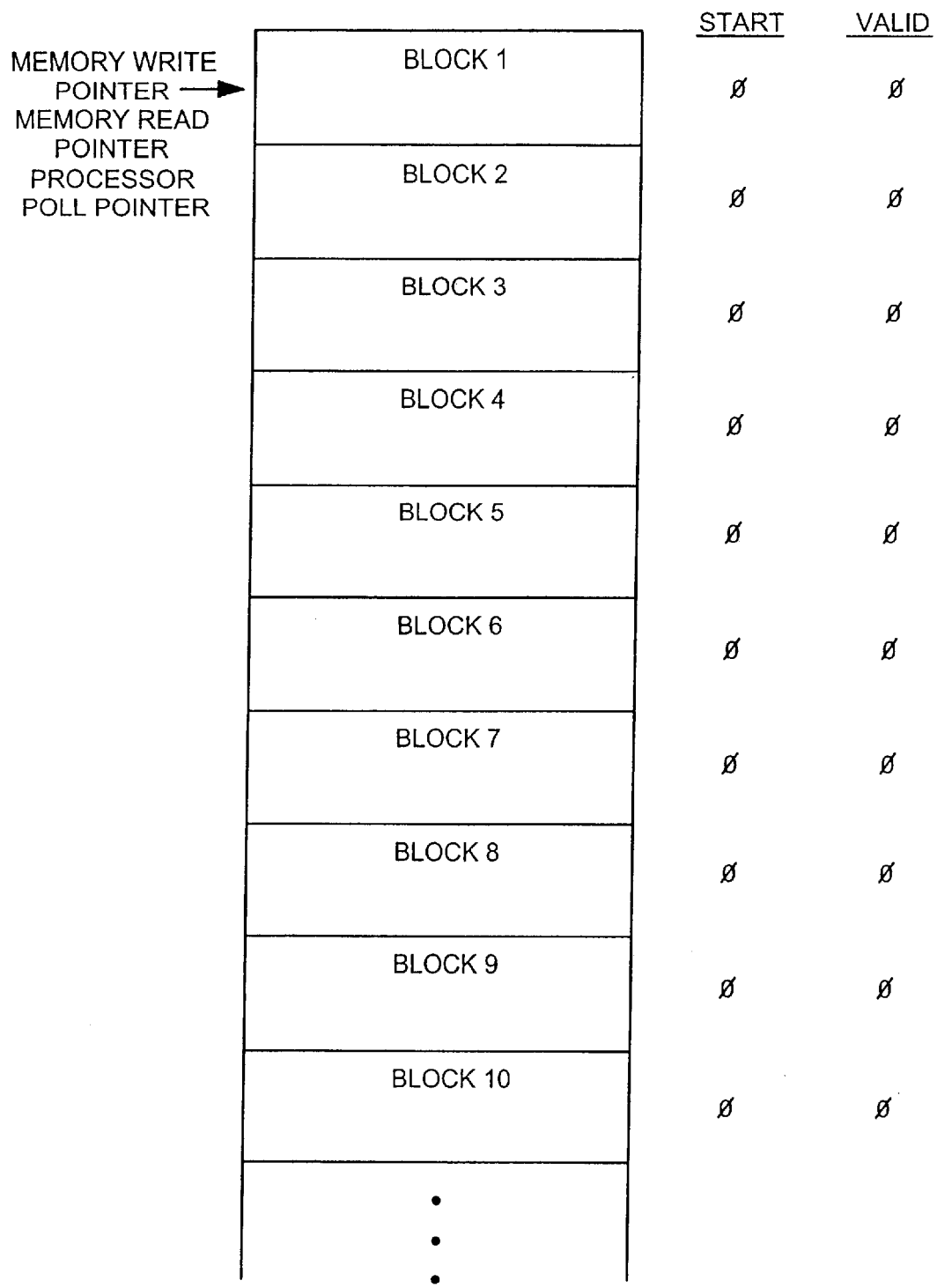
FIG. 1 shows exemplary state information associated with ten (10) FIFO elements before any packets are stored in the packet memory.

As discussed above, the internal data path architecture of the communication controller is one factor that determines the packet throughput of the communication controller. Furthermore, certain data communication network configurations require that the communication controller forward the packets in first-in-first-out (FIFO) order. Therefore, an internal data path architecture that expedites the processing of packets while maintaining FIFO order is valuable, and therefore desirable.

The present invention provides an efficient data path architecture for processing packets and maintaining packet order within a communication controller. Specifically, a novel memory controller (referred to hereinafter as the "FIFO Manager") is used to coordinate accesses to a memory for writing packets into the memory, processing the packets in an order-independent fashion, and reading the packets from the memory in order. The memory is logically divided into a number of consecutive memory blocks (referred to hereinafter individually as a "FIFO element" and collectively as the "FIFO") in which packets are stored. A packet may require one or more consecutive FIFO elements. The FIFO Manager maintains, among other things, status information for each FIFO element in the memory. In a preferred embodiment of the present invention, the status information for each FIFO element includes a START indicator for indicating whether the corresponding FIFO element contains the beginning portion of a packet, and also includes a VALID indicator for indicating whether the packet stored in the corresponding FIFO element is ready to be forwarded. Packets may become available for forwarding out of order, but the FIFO Manager maintains packet order by allowing a packet to be forwarded only after all preceding packets have been forwarded.

Packets are stored in the packet memory FIFO in FIFO order. Specifically, each packet is written into a number of consecutive FIFO elements in the memory. When a packet is written into the memory, the FIFO Manager sets the START indicator corresponding to the first FIFO element associated with the packet. The VALID indicator is reset, indicating that the packet is not ready to be forwarded.

The FIFO Manager provides packets to a packet processor, such as a routing processor, in FIFO order. The packet processor is typically capable of processing multiple packets simultaneously. When the packet processor completes the processing of a particular packet, the FIFO Manager sets the VALID indicator corresponding to the first FIFO element associated with that packet, indicating that the packet is ready to be forwarded. The packet processor may complete the processing of the packets out of order, and therefore the packets may become ready to be forwarded out of order.

The FIFO Manager allows the packets to be read from the packet memory in FIFO order. Specifically, the FIFO Manager determines a next packet to be forwarded, and monitors the VALID indicator corresponding to the first FIFO element associated with the packet. When the VALID indicator is set, the FIFO Manager sends a signal to a packet reader indicating that the next packet is available to be read. The packet reader issues a series of commands (opcodes) to the FIFO Manager in order to read the packet from the packet memory. The FIFO Manager resets the START and VALID indicators associated with the packet when the end of the packet is read from the packet memory. The FIFO Manager then determines a next packet to be forwarded, and proceeds to monitor the VALID indicator corresponding to the first FIFO element associated with the next packet. In this way, packets are forwarded in FIFO order, even if the packets become available to be forwarded out of order.

In a preferred embodiment of the present invention, the FIFO Manager maintains a memory write pointer that indicates the next FIFO element that is available for storing a packet. A packet is stored in a number of consecutive FIFO elements, beginning with the FIFO element indicated by the memory write pointer. When the packet is stored in the memory, the FIFO Manager sets the START indicator corresponding to the first FIFO element associated with the packet and updates the memory write pointer to indicate the next FIFO element that is available for storing a packet.

In a preferred embodiment of the present invention, the FIFO Manager also maintains a processor poll pointer that indicates the next packet that is available to be processed by the packet processor, and specifically indicates the first FIFO element associated with the packet. When a packet is processed by the packet processor, the FIFO Manager updates the processor poll pointer to indicates the next packet that is available to be processed by the packet processor.

In a preferred embodiment of the present invention, the FIFO Manager further maintains a memory read pointer that indicates the next packet that is available to be read from the packet memory. The FIFO Manager continually monitors the VALID indicator corresponding to the first FIFO element associated with the packet indicated by the memory read pointer. When the VALID indicator is set, the FIFO Manager enables the packet to be read from the memory. After the packet is forwarded, the FIFO Manager resets the START indicator and the VALID indicator associated with the packet, and updates the memory read pointer to indicate the next packet that is available to be forwarded by the FIFO Manager.

The packet handling techniques of the FIFO Manager and the relationships between the memory write pointer, the processor poll pointer, and the memory read pointer can be demonstrated by example.

FIG. 1 shows exemplary state information associated with ten (10) FIFO elements before any packets are stored in the packet memory. In this initial state, each of the pointers indicates FIFO element 1, and the START indicator and the VALID indicator for each FIFO element are in the reset state.

Figure 2:
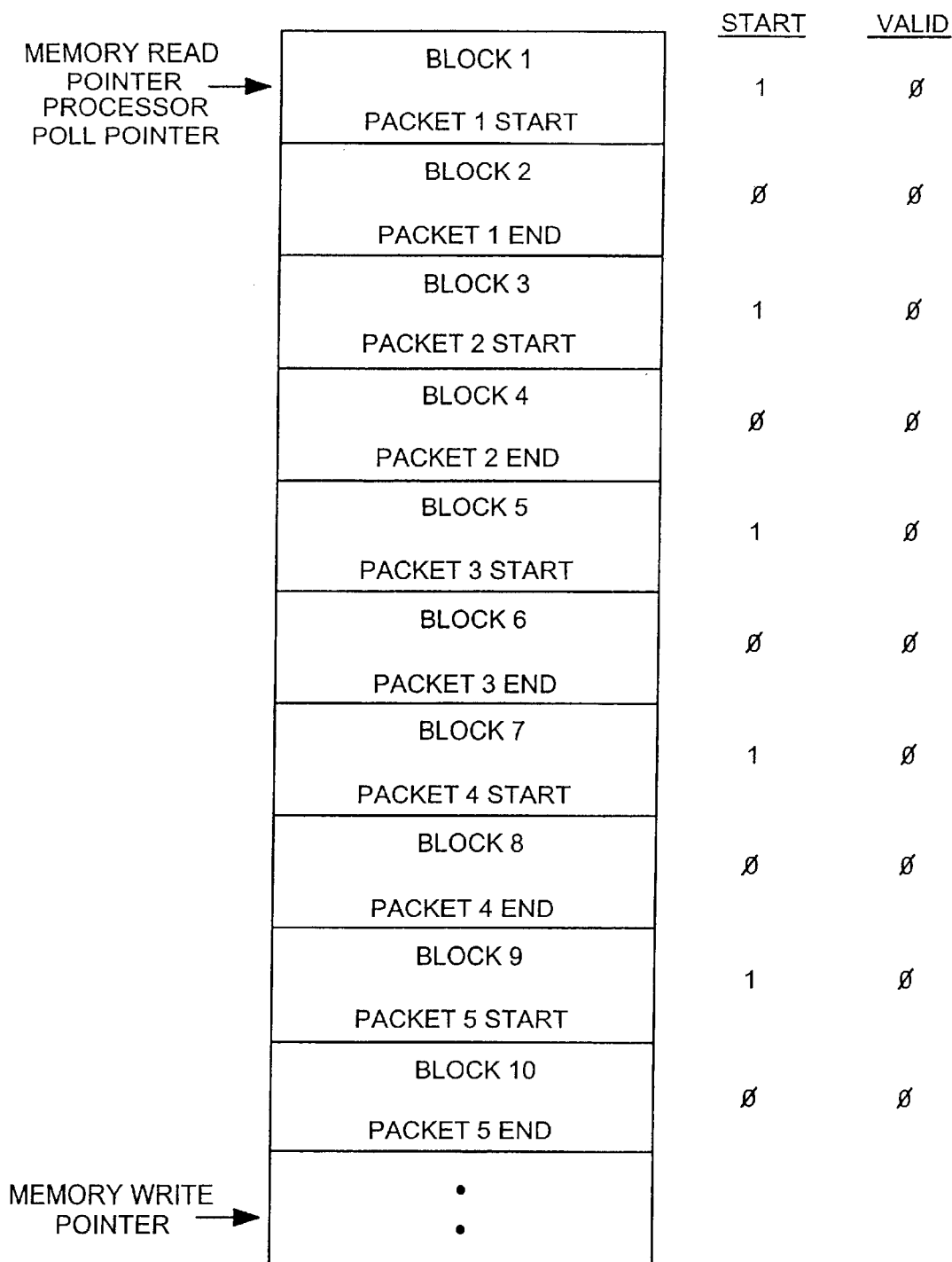
FIG. 2 shows exemplary state information associated with the ten (10) FIFO elements after five (5) packets are stored in the packet memory.

At some point, a number of packets are stored in the packet memory. FIG. 2 shows exemplary state information for the ten (10) FIFO elements after receiving and storing five (5) packets, where each packet requires two (2) FIFO elements. As shown in FIG. 2, the START indicator corresponding to the first FIFO element for each packet is set, and the memory write pointer points to the next available FIFO element (i.e., FIFO element 11). The memory read pointer and processor poll pointer continue to point to the FIFO element 1.

Figure 3:
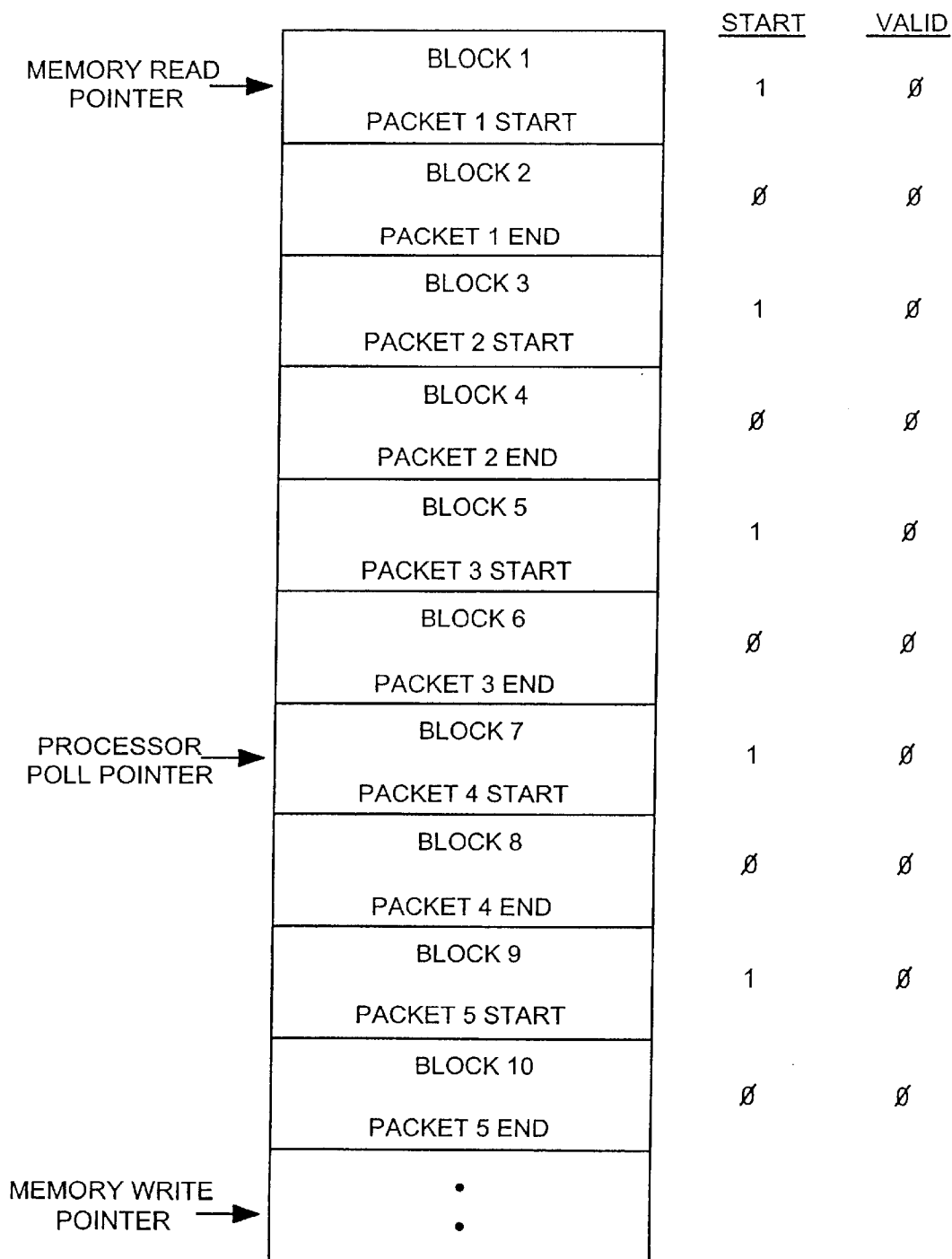
FIG. 3 show exemplary state information associated with the ten (10) FIFO elements after three (3) packets have been forwarded to the packet processor.

Some time after the packets are stored in the packet memory, the packet processor requests a number of packets. FIG. 3 shows exemplary state information for the ten (10) FIFO elements after the packet processor requests three (3) packets. As shown in FIG. 3, the processor poll pointer points to the first FIFO element in the next packet to be processed by the packet processor (i.e., packet 4 starting in FIFO element 7). The memory read pointer continues to point to the FIFO element 1, waiting for both the START indicator and the VALID indicator to be set.

Figure 4:
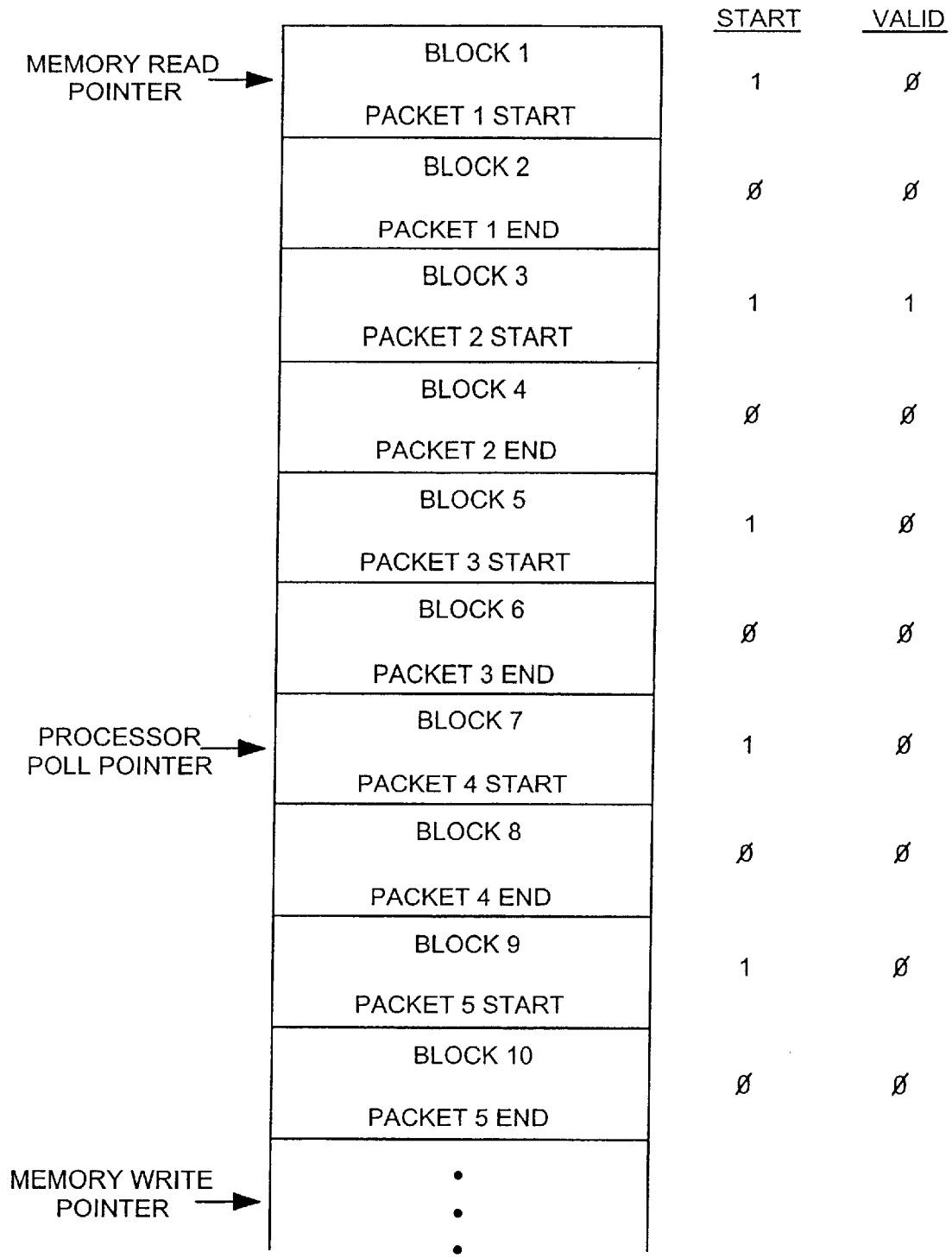
FIG. 4 show exemplary state information associated with the ten (10) FIFO elements after the second packet becomes ready to be forwarded out of order.

The packet processor processes each of the three (3) requested packets. Even though the packet processor receives the packets in FIFO order, the packet processor may complete the processing of each packet out of order. FIG. 4 shows exemplary state information for the ten (10) FIFO elements after the packet processor completes the processing of packet 2. Specifically, as shown in FIG. 4, the VALID indicator corresponding to the first FIFO element for packet 2 (i.e., FIFO element 3) is set to indicate that the packet is ready to be forwarded. However, because packet 1 has not yet been forwarded, packet 2 is not forwarded. Therefore, the memory read pointer continues to point to the FIFO element 1, waiting for both the START indicator and the VALID indicator to be set.

Figure 5:
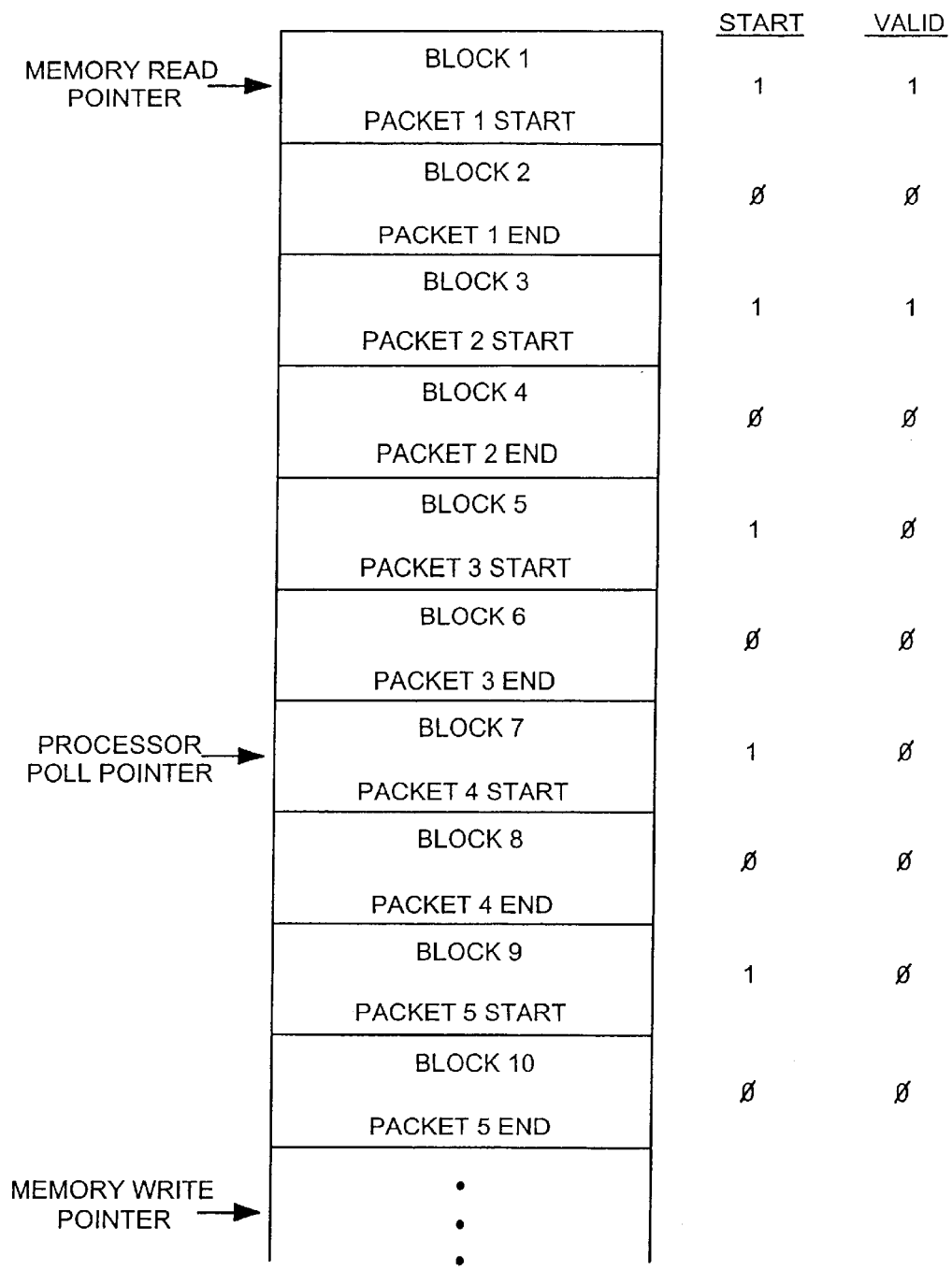
FIG. 5 show exemplary state information associated with the ten (10) FIFO elements after the first packet becomes ready to be forwarded.

At some later time, the packet processor completes the processing of packet 1. FIG. 5 shows exemplary state information for the ten (10) FIFO elements after the packet processor completes the processing of packet 1. Specifically, as shown in FIG. 5, the VALID indicator corresponding to the first memory block for packet 1 (i.e., FIFO element 1) is set to indicate that the packet is ready to be forwarded.

Figure 6:
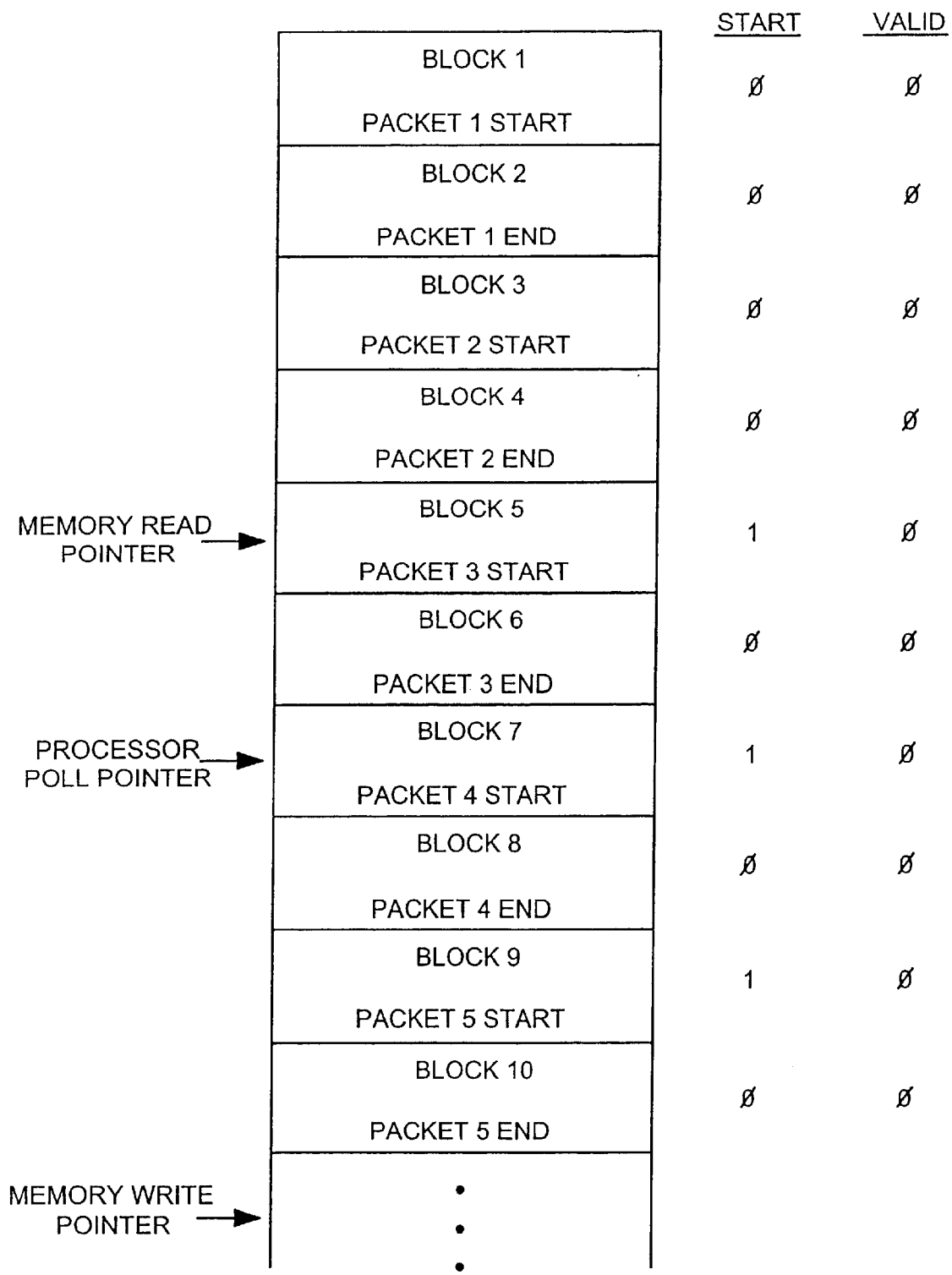
FIG. 6 show exemplary state information associated with the ten (10) FIFO elements after the first two packets have been forwarded.

At this point, both packet 1 and packet 2 are ready to be forwarded, packet 3 is still being processed by the packet processor, and packets 4 and 5 are still pending processing by the packet processor. As described above, the FIFO Manager continually monitors the VALID indicator corresponding to the FIFO element indicated by the memory read pointer (which, at this point, indicates FIFO element 1) to determine when the VALID indicator is set. The FIFO Manager detects that the VALID indicator corresponding to FIFO element 1 is set. Therefore, the FIFO Manager enables the packet stored in FIFO elements 1 and 2 to be forwarded. After the packet is forwarded, the FIFO Manager resets the START indicator and the VALID indicator corresponding to FIFO element 1, and updates the memory read pointer to indicate the next packet to be forwarded (i.e., packet 2 starting in FIFO element 3). The FIFO Manager then detects that the VALID indicator corresponding to FIFO element 3 is set. Therefore, the FIFO manager enables the packet stored in FIFO elements 3 and 4 to be forwarded. After the packet is forwarded, the FIFO Manager resets the START indicator and the VALID indicator corresponding to FIFO element 3, and updates the memory read pointer to indicate the next packet to be forwarded (i.e., packet 3 starting in FIFO element 5). Since the VALID indicator corresponding to FIFO element 5 is reset, The FIFO Manager does not enable packet 3 to be forwarded. Instead, the FIFO Manager monitors the VALID indicator corresponding to FIFO element 5 waiting for the VALID indicator to be set. FIG. 6 shows exemplary state information for the ten (10) FIFO elements after packets 1 and 2 are forwarded.

Figure 7:
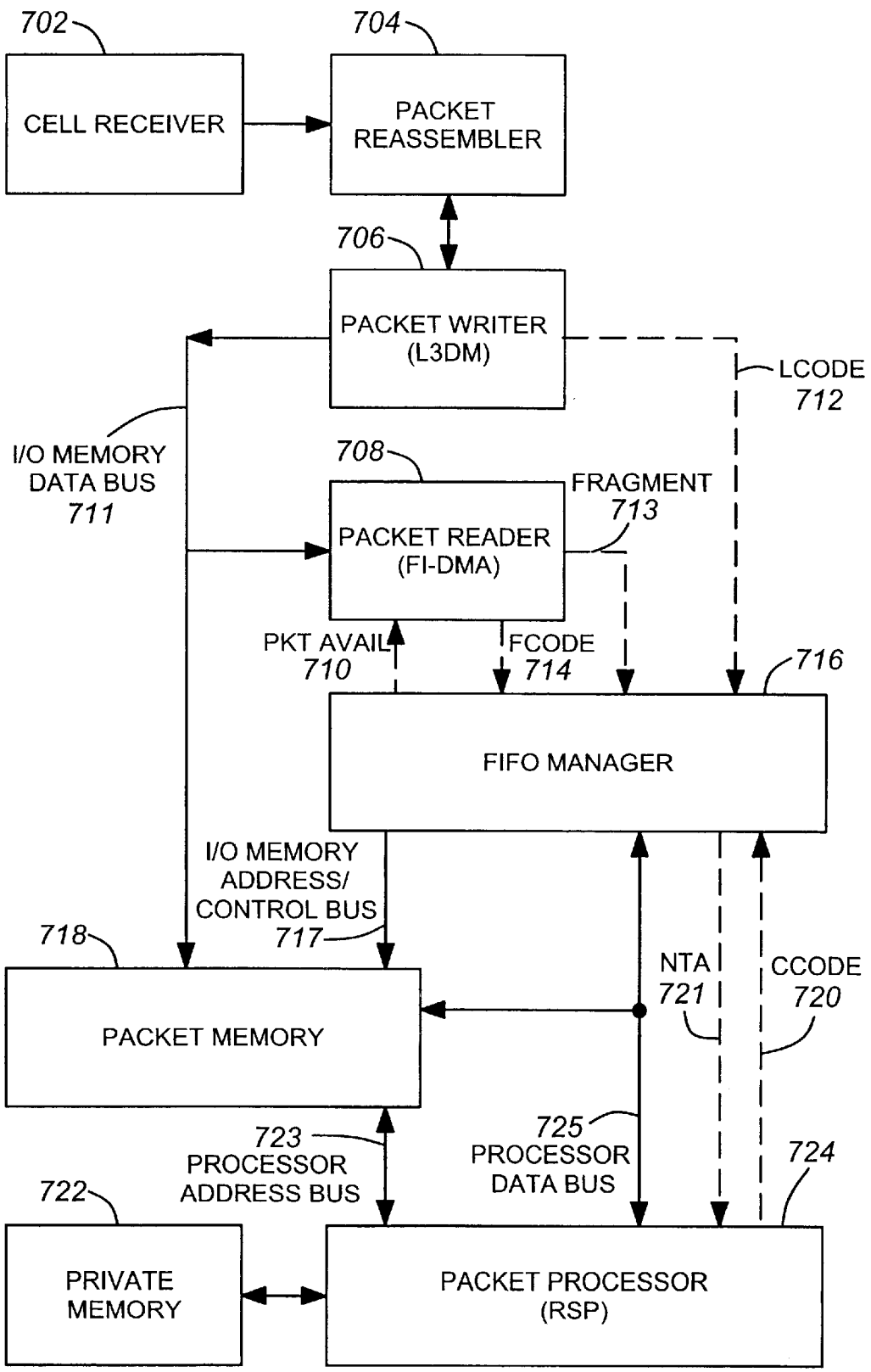
FIG. 7 is a block diagram showing an exemplary packet processing system including a FIFO Manager in accordance with a first exemplary embodiment of the present invention.

In a preferred embodiment of the present invention, the FIFO Manager is an integral part of a packet processing architecture of an ATM communication controller. FIG. 7 shows a first exemplary embodiment of the packet processing architecture. In the first exemplary embodiment of the packet processing architecture as shown in FIG. 7, the FIFO Manager 716 coordinates access to the Packet Memory 718 in order to allow packets to be written into the Packet Memory 718 by the Packet Writer 706 in FIFO order, processed by the Packet Processor 724 in an order-independent fashion, and read from the Packet Memory 718 by the Packet Reader 708 in FIFO order. The Packet Memory 718 is preferably (although not necessarily) a dual port memory. Each port of the Packet Memory 718 includes, among other things, address, data and control bus signals. One port of the Packet Memory 718, referred to hereinafter as the input/output (I/O) port, is coupled to the Packet Writer 706 and the Packet Reader 708 via an I/O Memory Data Bus 711 and to the FIFO Manager 716 via an I/O Memory Address/Control Bus 717. The other port of the Packet Memory 718, referred to hereinafter as the processor port, is coupled to the Packet Processor 724 via a Processor Address Bus 723 and a Processor Data Bus 725.

In a preferred embodiment of the present invention, the Packet Memory 718 is divided into a FIFO element section, a fragmentation header section, and an injected packet buffer. The FIFO element section of the Packet Memory 718 is divided into 384 512-byte FIFO elements that are addressed using a 15-bit address, where the nine (9) most significant address bits (i.e., address bits 6 through 14) indicate the FIFO element number, and the six (6) least significant address bits (i.e., address bits 0 through 5) indicate an offset within the particular FIFO element. The fragmentation header section of the Packet Memory 718 is divided into 384 128-byte fragmentation headers (i.e., one fragmentation header per FIFO element) that are used for segmenting packets. The injected packet buffer is a 16K byte buffer that is used by the Packet Processor 724 to inject a packet, such as loopback packet, diagnostic packet, or informational packet, into the packet steam through a mechanism that is described in detail below.

Packets within the ATM network are segmented into one or more ATM cells. The

ATM communication controller receives the ATM cells via the Cell Receiver 702. The Cell Receiver 702 forwards the ATM cells to the Packet Reassembler 704, which reassembles a packet from the packet segments contained in one or more ATM cells. The Packet Reassembler 704 forwards the reassembled packet to the Packet Writer 706, which sends LCODE commands to the FIFO Manager 716 over the LCODE interface 712 in order to write the packet into the Packet Memory 718.

Specifically, the Packet Writer 706 uses LCODE commands to transfer the packet into the Packet Memory 718 one word at a time, and also to signal the FIFO Manager 716 at the end of the packet. In order to transfer one word of the packet into the Packet Memory 718, the Packet Writer 706 writes the word onto the I/O Memory Data Bus 711 and sends an LCODE command to the FIFO Manager 716 via the LCODE interface 712. Upon receiving the LCODE command, the FIFO Manager 716 uses the memory write pointer (described above) to determine the specific target memory location within the Packet Memory 718. The FIFO Manager 716 then writes the target memory location address onto the I/O Memory Address/Control Bus 717, and executes a memory write function over the I/O Memory Address/Control Bus 717 to write the word into the target memory location.

The LCODE interface 712 is a three-bit wide interface that is used to send LCODE commands to the FIFO Manager 716. The following LCODE commands are supported:

| | |
|---|---|
| LCODE[2:0] = "000" | LCODE IDLE |
| LCODE[2:0] = "001" | LCODE WRITE |
| LCODE[2:0] = "010" | LCODE WRITE LAST |
| LCODE[2:0] = "011" | Unused combination |
| LCODE[2:0] = "1nn" | LCODE SKIP nn |

The LCODE WRITE, WRITE LAST, and SKIP nn commands all cause a single word to be written into the Packet Memory 718. The LCODE WRITE command causes the FIFO Manager 716 to write a single word into the Packet Memory 718 and to increment the memory write pointer to the next word location in the Packet Memory 718. The LCODE SKIP nn command causes the FIFO Manager 716 to write a single word into the Packet Memory 718 and to increment the memory write pointer by (nn+1). The LCODE WRITE LAST command causes the FIFO Manager 716 to write a single word into the Packet Memory 718, set the START indicator in the first FIFO element associated with the packet, increment a packet counter that is used to keep track of the number of packets stored in the Packet Memory 718, and increment the memory write pointer to the start of the next FIFO element. Thus, the Packet Writer 706 typically sends a series of LCODE WRITE commands followed by an LCODE WRITE LAST command to the FIFO Manager 716 in order to write an entire packet into the Packet Memory 718. It should be noted that the Packet Writer 706 determines the end of the packet, and therefore determines when to send the LCODE WRITE LAST command, based upon a packet length contained in the packet header.

Once one or more packets are stored in the Packet Memory 718, the Packet Processor processes the packets. In a preferred embodiment of the present invention, the Packet Processor 724 is a routing processor that determines a destination for each packet and modifies the packet header to include the destination information. In addition to routing or otherwise processing the received packets, the Packet Processor 724 can also insert a new packet into the packet stream. For example, the Packet Processor 724 may insert a loopback packet, a diagnostic packet, or in informational packet into the packet stream. The inserted packet is forwarded ahead of any other packets that are ready to be forwarded.

The Packet Processor 724 interfaces to the FIFO Manager 716 via the CCODE interface 720. The CCODE interface 720 is a three-bit wide interface that is used to send CCODE commands to the FIFO Manager 716. The following CCODE commands are supported:

| | |
|---|---|
| CCODE[2:0] = "000" | CCODE IDLE |
| CCODE[2:0] = "001" | CCODE POLL |
| CCODE[2:0] = "010" | CCODE SET VALID |
| CCODE[2:0] = "011" | CCODE INJECT PACKET |

In order to obtain the next packet from the Packet Memory 718 that is available for processing (i.e., the packet starting at the FIFO element indicated by the processor poll pointer), the Packet Processor 724 sends a CCODE POLL command to the FIFO Manager 716 over the CCODE interface 720. The FIFO Manager 716 uses the NTA interface 721 to indicate whether or not a packet is available for processing. Assuming that there is a packet available for processing, the FIFO Manager 716 transfers certain information to the Packet Processor 724 over the Processor Data Bus 725, and updates the processor poll pointer to indicate the first FIFO element for the next packet. In a preferred embodiment of the present invention, the information transferred by the FIFO Manager 716 to the Packet Processor 724 includes a pointer to the FIFO element in the Packet Memory 718, and also includes the first 32 bytes of the packet. The Packet Processor 724 obtains the packet directly from the Packet Memory 718 using the Processor Address Bus 723 and the Processor Data Bus 725.

In a preferred embodiment of the present invention, the Packet Processor 724 is able to process up to 32 packets at a time. Therefore, the Packet Processor 724 continues to poll the FIFO Manager 716 over the CCODE interface 720 in order to obtain up to 32 packets from the Packet Memory 718.

When the Packet Processor 724 completes the processing of a particular packet, the Packet Processor 724 signals the FIFO Manager 716 to set the VALID indicator corresponding to the first FIFO element associated with the packet. Therefore, the Packet Processor 724 sends a CCODE SET VALID command to the FIFO Manager 716 over the CCODE interface 720, and indicates the FIFO element number over the Processor Data Bus 725. Upon receiving the CCODE SET VALID command, the FIFO Manager 716 sets the VALID indicator corresponding to the specified FIFO element.

In order to insert a packet into the packet stream, the Packet Processor 724 writes the new packet into the injected packet buffer, and sends a CCODE INJECT PACKET command to the FIFO Manager 716 over the CCODE interface 720.

The FIFO Manager 716 includes logic for determining when a packet is ready to be forwarded. As described above, the FIFO Manager 716 maintains the memory read pointer to indicate the first FIFO element of the next packet to be forwarded, and determines when the packet is ready to be forwarded based upon the VALID indicator corresponding to that FIFO element. The FIFO Manager 716 determines that the packet is ready to be forwarded when the VALID indicator is set. Also, the FIFO Manager 716 determines that the injected packet is ready to be forwarded when the CCODE INJECT PACKET command is received from the Packet Processor 724.

When a packet is ready to be forwarded, the FIFO Manager 716 signals the Packet Reader 708 via the Packet Available (PKT AVAIL) signal 710. Upon receiving the PKT AVAIL signal 710, the Packet Reader 708 sends FCODE commands to the FIFO manager 716 over the FCODE interface 714 in order to read the packet from the Packet Memory 718. If an injected packet is ready to be forwarded, the FIFO Manager 716 transfers the injected packet from the injected packet buffer ahead of any other packets that are ready to be forwarded. Otherwise, the FIFO Manager 716 transfers the packet that begins at the FIFO element indicated by the memory read pointer.

Specifically, the Packet Reader 708 uses FCODE commands to transfer the packet from the Packet Memory 718 one word at a time, and also to signal the FIFO Manager 716 at the end of the packet. In order to transfer one word of the packet from the Packet Memory 718, the Packet Reader 708 sends an FCODE command to the FIFO Manager 716 via the FCODE interface 714, and monitors the I/O Memory Data Bus 711 for the data. Upon receiving the FCODE command, the FIFO Manager 716 determines whether to transfer the injected packet or the next packet that is ready to be forwarded. If an injected packet is ready to be forwarded, then the FIFO Manager 716 uses an injected packet read pointer to determine the specific target memory location within the injected packet buffer in the Packet Memory 718. If the injected packet is not ready to be forwarded, then the FIFO Manager 716 uses the memory read pointer (described above) to determine the specific target memory location within the Packet Memory 718. Once the FIFO Manager 716 has determined a target memory location within the Packet Memory 718, the FIFO Manager 716 writes the target memory location address onto the I/O Memory Address/Control Bus 717, and executes a memory read function over the I/O Memory Address/Control Bus 717 to read the word from the target memory location. The Packet Memory 718 outputs the word onto the I/O Memory Data Bus 711, from which the Packet Reader 708 obtains the word.

The FCODE interface 714 is a three-bit wide interface that is used to send FCODE commands to the FIFO Manager 716. The following FCODE commands are supported:

| | |
|---|---|
| FCODE[2:0] = "000" | FCODE IDLE |
| FCODE[2:0] = "001" | FCODE READ |
| FCODE[2:0] = "010" | FCODE READ LAST |
| FCODE[2:0] = "011" | FCODE READ IDLE |
| FCODE[2:0] = "110" | FCODE RELEASE |

The FCODE READ, READ LAST, READ IDLE, and RELEASE commands all cause a single word to be read from the Packet Memory 718. The FCODE READ command causes the FIFO Manager 716 to read a single word from the Packet Memory 718 and to increment the read pointer (i.e., the injected packet read pointer or the memory read pointer) to the next word location in the Packet Memory 718. The FCODE READ LAST command causes the FIFO Manager 716 to read a single word from the Packet Memory 718, increment the read pointer to the next FIFO element, clear the START indicator and VALID indicator corresponding to the first FIFO element associated with the forwarded packet, and decrement the packet counter. The FCODE READ IDLE command is the same as the FCODE READ command, except that the read pointer is not incremented. The FCODE RELEASE command is the same as the FCODE READ LAST command, except that the packet counter is not decremented. Thus, the Packet Reader 708 typically sends a series of FCODE READ commands followed by an FCODE READ LAST command to the FIFO Manager 716 in order to read an entire packet from the Packet Memory 718. It should be noted that the Packet Reader 708 determines the end of the packet, and therefore determines when to send the FCODE READ LAST command, based upon a packet length contained in the packet header. Once the Packet Reader 708 has read an entire packet from the Packet Memory 718, the Packet Reader 708 forwards the packet to a backplane switching fabric (which, for the sake of clarity, is not shown in FIG. 7).

As mentioned briefly above, the FIFO Manager 716 allows a packet to be segmented. In a preferred embodiment of the present invention, the each packet segment must be larger than the FIFO element size (which, in a preferred embodiment, is 512 bytes). In order to create multiple packet segments from a single packet, the packet is segmented such that each packet segment begins within a particular FIFO element (although not necessarily at the start of the FIFO element). A packet segment header is created in the fragmentation header corresponding to each such FIFO element. When reading a packet from the Packet Memory 718, the Packet Reader 708 can request either the fragmentation header or the packet information using the FRAGMENT signal 713. Specifically, in order to read the packet segment header for a particular packet segment, the Packet Reader 708 asserts the FRAGMENT signal 713 and sends successive FCODE READ commands to the FIFO Manager 716. With the FRAGMENT signal 713 asserted, the FIFO Manager 716 writes the fragmentation header address onto the I/O Memory Address/Control Bus 717, causing the fragmentation header to be read rather than the FIFO element. After the packet segment header has been read, the Packet Reader 708 deasserts the FRAGMENT signal 713 and proceeds to read the packet segment contents from the FIFO element using FCODE READ commands as described above.

Figure 8:
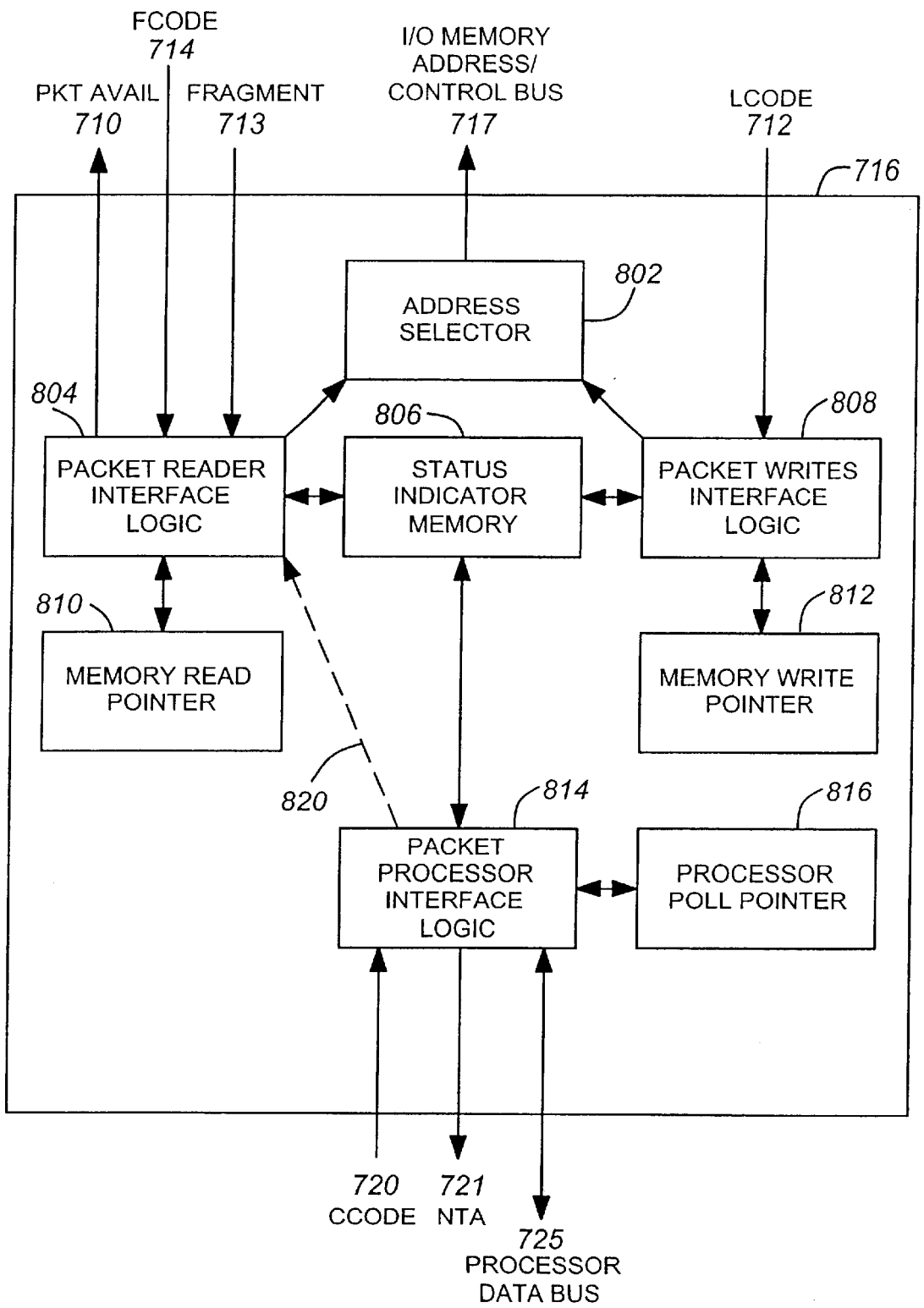
FIG. 8 is a block diagram showing the major logic blocks of an exemplary FIFO Manager in accordance with the first exemplary embodiment of the present invention.

FIG. 8 is a block diagram showing the major logic blocks of an exemplary FIFO Manager 716 in accordance with the first exemplary embodiment of the invention as shown in FIG. 7. The FIFO Manager 716 includes Packet Writer Interface Logic 808 for coordinating storage of packets by the Packet Writer 706 into the Packet Memory 718, Packet Processor Interface Logic 814 for coordinating access to the packets by the Packet Processor 724, and Packet Reader Interface Logic 804 for coordinating retrieval of packets by the Packet Reader 708. The Packet Writer Interface Logic 808, Packet Processor Interface Logic 814, and Packet Reader Interface Logic 804 are coupled to a Status Indicator Memory 806, which includes the START indicator and VALID indicator for each of the FIFO elements in the Packet Memory 718.

The Packet Writer Interface Logic 808 is operably coupled to the Packet Writer 706 via the LCODE interface 712. The Packet Writer Interface Logic 808 receives LCODE commands from the Packet Writer 706 instructing the Packet Writer Interface Logic 808 to write the packet contents into a number of successive FIFO elements in the Packet Memory 718. The Packet Writer Interface Logic 808 uses the Memory Write Pointer 812 to determine the destination location for each word in the Packet Memory 718, and provides memory addresses to the Packet Memory 718 via the Address Selector 802. Upon receiving an LCODE WRITE LAST command from the Packet Writer 706 over the LCODE interface 712, the Packet Writer Interface Logic 808 sets the START indicator in the Status Indicator Memory 806 corresponding to the first FIFO element associated with the stored packet. The Packet Writer Interface Logic 808 updates the Memory Write Pointer 812 to indicate the next available FIFO element.

The Packet Processor-Interface Logic 814 is operably coupled to the Packet Processor 724 via the CCODE interface 720, the NTA interface 721, and the Processor Data Bus 725. The Packet Processor Interface Logic 814 receives CCODE POLL commands from the Packet Processor 724 requesting packets for processing. The Packet Processor Interface Logic 814 uses the Processor Poll Pointer 816 to determine the next packet to be processed. Specifically, the Packet Processor Interface Logic 814 monitors the START indicator corresponding to the FIFO element indicated by the Processor Poll Pointer 816 to determine whether the next packet is ready to be processed. If the packet is ready to be processed (i.e., the START indicator is set), then the Packet Processor Interface Logic 814 returns a positive acknowledgment to the Packet Processor 724 over the NTA interface 721, transfers the FIFO element number and first 32 bytes of the packet to the Packet Processor 724 over the Processor Data Bus 725, and updates the Processor Poll Pointer 816 to indicate the first FIFO element for the next packet. If the packet is not ready to be processed (i.e., the START indicator is reset), then the Packet Processor Interface Logic 814 returns a negative acknowledgment to the Packet Processor 724 over the Processor Data Bus 725.

The Packet Processor Interface Logic 814 also receives CCODE SET VALID commands from the Packet Processor 724. Each CCODE SET VALID command is accompanied by a FIFO element number that the Packet Processor Interface Logic 814 receives over the Processor Data Bus 725. Upon receiving the CCODE SET VALID command and the accompanying FIFO element number from the Packet Processor 724, the Packet Processor Interface Logic 814 sets the VALID indicator corresponding to the specified FIFO element.

The Packet Processor Interface Logic 814 also receives CCODE INJECT PACKET commands from the Packet Processor 724 in order to inject a packet into the packet stream. Upon receiving the CCODE SET VALID command from the Packet Processor 724, the Packet Processor Interface Logic 814 signals the Packet Reader Interface Logic 804 via the signal 820 that the injected packet stored in the injected packet buffer in the Packet Memory 718 is ready to be forwarded.

The Packet Reader Interface Logic 804 determines when a packet is ready to be forwarded, and signals the Packet Reader 708 via the Packet Available (PKT AVAIL) signal 710. The packet can be either an injected packet that is stored in the injected packet buffer in the Packet Memory 718 or the next packet in the FIFO that is available to be forwarded. In order to determine whether the injected packet is ready to be forwarded, the Packet Reader Interface Logic 804 monitors for the signal 820 from the Packet Processor Interface Logic 814 to indicate that the injected packet is ready to be forwarded. In order to determine whether the next packet in the FIFO is ready to be forwarded, the Packet Reader Interface Logic 804 uses the Memory Read Pointer 810 to determine the next packet available to be forwarded, and monitors the VALID indicator corresponding to the first FIFO element associated with that packet in order to determine when the packet is ready to be forwarded.

When the Packet Reader Interface Logic 804 determines that a packet is ready to be forwarded, the Packet Reader Interface Logic 804 signals the Packet Reader 708 over the Packet Available (PKT AVAIL) interface 710. The Packet Reader Interface Logic 804 then receives FCODE commands from the Packet Reader 708 instructing the Packet Reader Interface Logic 804 to output the packet contents to the Packet Reader 708. The FCODE commands may be accompanied by the FRAGMENT signal 713. If the injected packet is ready to be forwarded, then the Packet Reader Interface Logic 804 directs the read requests to the injected packet buffer section of the Packet Memory 708 via the Address Selector 802. If the next packet in the FIFO is ready to be forwarded and the FRAGMENT signal 713 is asserted, then the Packet Reader Interface Logic 804 directs the read requests to the fragmentation header corresponding to the FIFO element indicated by the Memory Read Pointer 810 via the Address Selector 802. If the next packet in the FIFO is ready to be forwarded and the FRAGMENT signal 713 is deasserted, then the Packet Reader Interface Logic 804 directs the read requests to the FIFO element indicated by the Memory Read Pointer 810 via the Address Selector 802. Upon receiving an FCODE READ LAST command from the Packet Reader 708 instructing the Packet Reader Interface Logic 804 to output the last word of a packet from the FIFO, the Packet Reader Interface Logic 804 resets both the START indicator and the VALID indicator corresponding to the first FIFO element associated with the forwarded packet, and updates the Memory Read Pointer 810 to indicate the next packet available to be forwarded.

Figure 9:
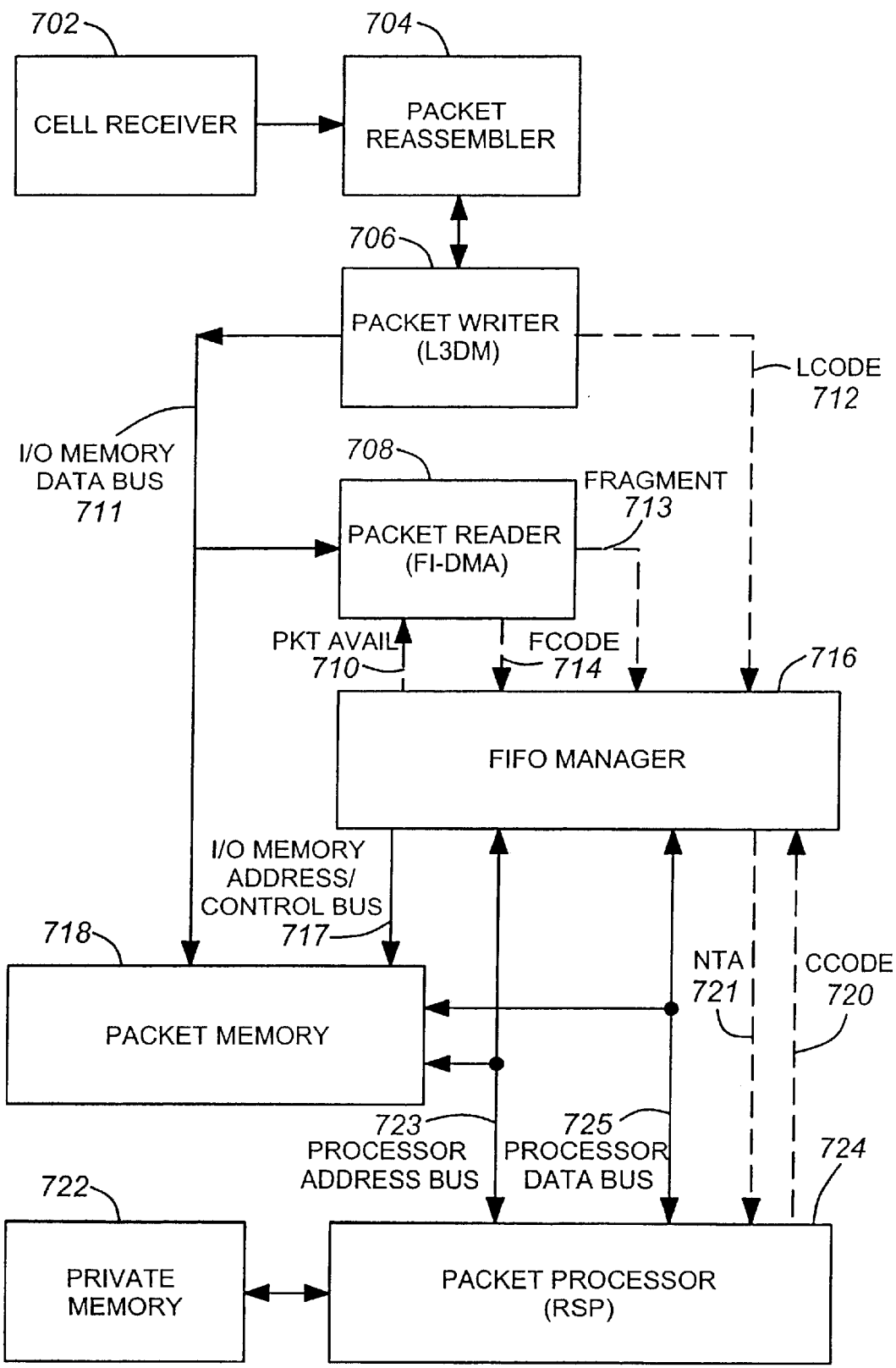
FIG. 9 is a block diagram showing an exemplary packet processing system including a FIFO Manager in accordance with a second exemplary embodiment of the present invention.

FIG. 9 shows a second exemplary embodiment of the packet processing architecture. The packet processing architecture shown in FIG. 9 is essentially the same as the packet processing architecture shown in FIG. 7, except that the interface between the FIFO Manager 716 and the Packet Processor 724 includes the Processor Address Bus 723. By including the Processor Address Bus 723 in the interface between the FIFO Manager 716 and the Packet Processor 724, the Packet Processor 724 can issue the CCODE SET VALID command to the FIFO Manager 716 at the same time that the Packet Processor 724 is writing data into the header of the corresponding packet in the Packet Memory 718, which is advantageous because it reduces the amount of packet processing time and makes the packet available for forwarding sooner. Specifically, the Packet Processor 724 typically updates information in the packet header, which is stored in the first FIFO element associated with the packet. In order for the Packet Processor 724 to write the last word of information into the packet header, the Packet Processor 724 uses the Processor Address Bus 723 and the Processor Data Bus 725 to provide the address and data for the write operation, respectively, and concurrently issues the CCODE SET VALID command to the FIFO Manager 716 over the CCODE interface 720. Because the nine (9) most significant address bits (i.e., address bits 6 through 14) indicate the FIFO element number, the FIFO Manager 716 obtains the FIFO element number for the CCODE SET VALID operation from the nine (9) most significant address bits (i.e., address bits 6 through 14) of the Processor Address Bus 723, as opposed to obtaining the FIFO element number for the CCODE SET VALID operation from the Processor Data Bus 725 as in the first exemplary embodiment of the invention described with reference to FIGS. 7 and 8 above.

Figure 10:
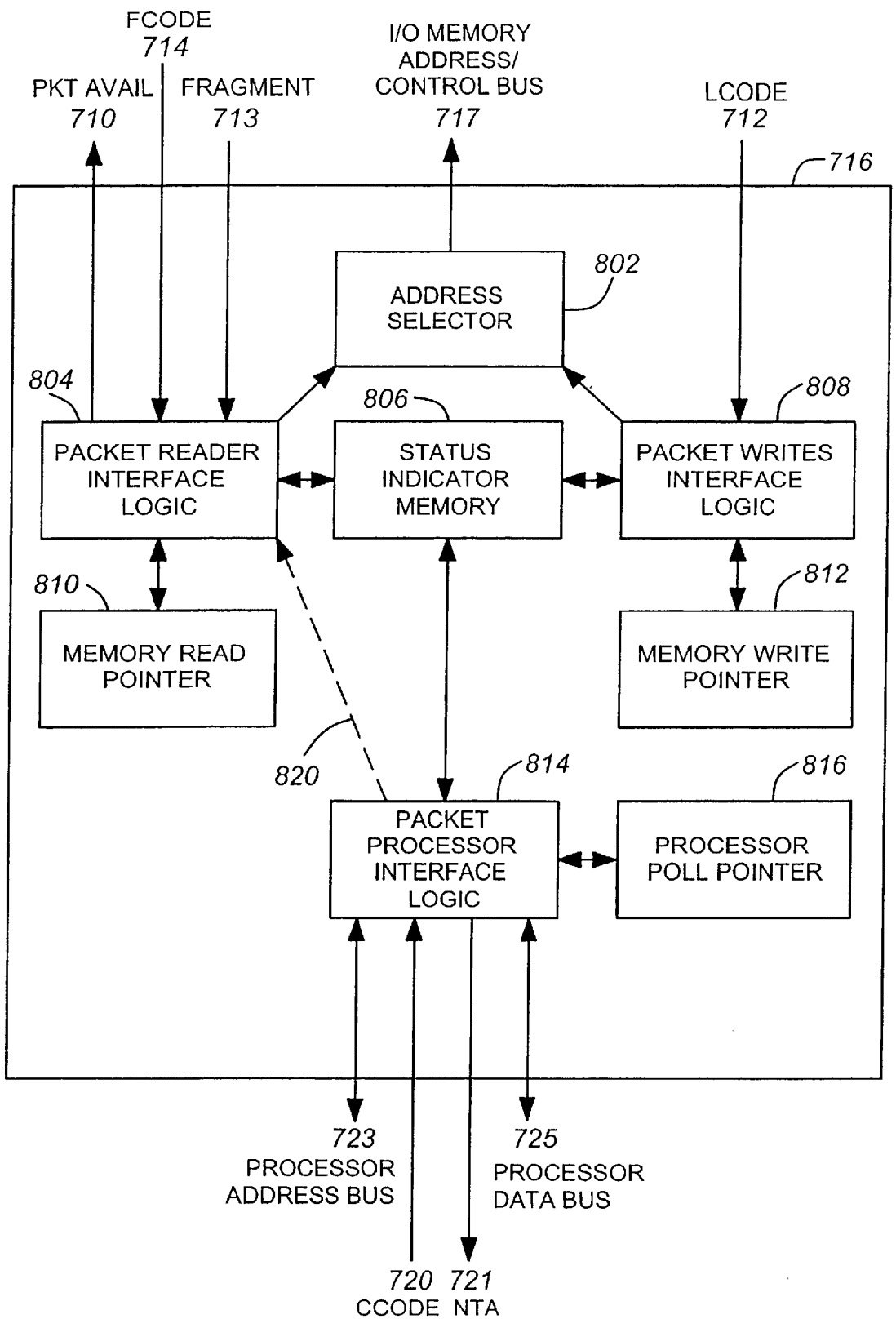
FIG. 10 is a block diagram showing the major logic blocks of an exemplary FIFO Manager in accordance with the second exemplary embodiment of the present invention.

FIG. 10 is a block diagram showing the major logic blocks of an exemplary FIFO Manager 716 in accordance with the second exemplary embodiment of the invention as shown in FIG. 9. The FIFO Manager shown in FIG. 10 is essentially the same as the FIFO Manager shown in FIG. 8, except that the Packet Processor Interface Logic 814 is operably coupled to the Packet Processor 724 additionally by the Processor Address Bus 723. When the Packet Processor Interface Logic 814 receives a CCODE SET VALID command from the Packet Processor 724, the Packet Processor Interface Logic 814 obtains the FIFO element number from the nine (9) most significant address bits (i.e., address bits 6 through 14) of the Processor Address Bus 723, as opposed to obtaining the FIFO element number for the CCODE SET VALID operation from the Processor Data Bus 725 as in the first exemplary embodiment of the invention described with reference to FIGS. 7 and 8 above.

In a preferred embodiment of the present invention, the various embodiments of the FIFO Manager 716 are implemented using hardware circuitry. This allows the various memory management functions of the FIFO Manager 716 to be performed very quickly. It also allows various functions to occur in parallel. For example, the FIFO Manager 716 is capable of coordinating the storage of a packet into the Packet Memory 718, providing packets to the Packet Processor 724, and monitoring for a packet that becomes ready to be forwarded, concurrently. The FIFO Manager 716 is preferably embodied as an Application Specific Integrated Circuit (ASIC), although the FIFO Manager may alternatively be embodied as a circuit composed of discrete components, as a component of a larger integrated circuit, as programmable logic used in conjunction with a programmable logic device such as a Field Programmable Gate Array (FPGA) or microprocessor, or any other means including any combination thereof.

The various memory management functions performed by the FIFO Manager 716 may be embodied in a software program that is stored in a computer readable medium and executed by an embedded microprocessor system within the communication controller. In such an embodiment, the various pointers as well as the START and VALID indicators are maintained in a portion of a memory, such as the Packet Memory 718. The software module (or modules) that coordinates the storage of packets sets the START indicator associated with a particular packet after the packet is stored in the Packet Memory 718, and also manipulates the memory write pointer as described above. The software module (or modules) that coordinates the processing of packets sets the VALID indicator associated with a particular packet when the packet is ready to be forwarded. The software module (or modules) that coordinates output of packets causes the packets to be forwarded in FIFO order as the packets become available to be forwarded, and clears the START indicator and the VALID indicator corresponding to a forwarded packet. Thus, many of the advantages of the FIFO Manager 716, and particularly the ability to maintain FIFO order for a system in which packets can become available for forwarding out of order, can be realized with a software implementation.

Software embodiments of the invention may be implemented in any conventional computer programming language. For example, preferred embodiments may be implemented in a procedural programming language (e.g., "C") or an object oriented programming language (e.g., "C++").

Alternative embodiments of the invention may be implemented as a computer program product for use with a computer system. Such implementation may include a series of computer instructions fixed either on a tangible medium, such as a computer readable media (e.g., a diskette, CD-ROM, ROM, or fixed disk), or fixed in a computer data signal embodied in a carrier wave that is transmittable to a computer system via a modem or other interface device, such as a communications adapter connected to a network over a medium. The medium may be either a tangible medium (e.g., optical or analog communications lines) or a medium implemented with wireless techniques (e.g., microwave, infrared or other transmission techniques). The series of computer instructions embodies all or part of the functionality previously described herein with respect to the system. Those skilled in the art should appreciate that such computer instructions can be written in a number of programming languages for use with many computer architectures or operating systems. Furthermore, such instructions may be stored in any memory device, such as semiconductor, magnetic, optical or other memory devices, and may be transmitted using any communications technology, such as optical, infrared, microwave, or other transmission technologies. It is expected that such a computer program product may be distributed as a removable medium with accompanying printed or electronic documentation (e.g., shrink wrapped software), preloaded with a computer system (e.g., on system ROM or fixed disk), or distributed from a server or electronic bulletin board over the network (e.g., the Internet or World Wide Web).

Thus, the present invention may be embodied as a method for coordinating read and write access to a plurality of memory blocks in a packet memory in order to provide first-in-first-out read access to the packets stored in the packet memory. Such a method comprises the steps of causing the packets to be written into the packet memory in first-in-first-out order; causing the packets to be processed by a packet processor; receiving, for each packet, an indication from the packet processor that the packet is ready to be forwarded, wherein the packets may become ready to be forwarded out of order; and causing the packets that become ready to be forwarded to be read from the packet memory in first-in-first-out order.

In a preferred embodiment of the present invention, the step of causing the packets to be written into the packet memory involves maintaining a START indicator and a VALID indicator corresponding to each of the plurality of successive memory blocks in the packet memory, maintaining a memory write pointer indicating a first available memory block for writing a packet into the packet memory, causing a packet to be written into a number of successive memory blocks beginning with the first available memory block, setting the START indicator corresponding to the first memory block of the number of successive memory blocks after the packet is written into the number of successive memory blocks, and updating the memory write pointer to indicate the next available memory block following the number of successive memory blocks used to store the packet.

In a preferred embodiment of the present invention, the step of causing the packets to be processed by the packet processor involves maintaining a processor poll pointer indicating a first memory block of a first packet to be processed by the packet processor, receiving from the packet processor a request for a packet, providing the packet processor with access to said first packet, and updating the processor poll pointer to indicate a first memory block of a next packet to be processed by the packet processor. The packet processor is provided with a pointer to the first memory block of the first packet to be processed by the packet processor, and also a portion of said first packet to the packet processor.

In a preferred embodiment of the present invention, the step of causing the packets that become ready to be forwarded to be read from the packet memory involves maintaining a memory read pointer indicating a first memory block of a first packet to be forwarded, monitoring the VALID indicator corresponding to the first memory block, causing the first packet to be read from the packet memory upon detecting that the VALID indicator is set to indicate that the packet is ready to be forwarded, updating the memory read pointer to indicate a first memory block associated with a next packet to be forwarded, and resetting the START indicator and the VALID indicator corresponding to the first memory block associated with the forwarded packet.

The present invention may also be embodied in an apparatus for coordinating read and write access to a plurality of memory blocks in a packet memory in order to provide first-in-first-out read access to the packets stored in the packet memory. The apparatus includes status indicator memory including a START indicator and a VALID indicator for each of the plurality of memory blocks in the packet memory, packet writer interface logic operably coupled to set the START indicator corresponding to a first memory block associated with each packet stored in the packet memory, packet processor interface logic operably coupled to if set the VALID indicator corresponding to a first memory block associated with each packet stored in the packet memory that is ready to be forwarded, and packet reader interface logic operably coupled to monitor the VALID indicator corresponding to a first memory block associated with a first packet to be forwarded and produce an output signal upon detecting that the VALID indicator is set to indicate that said first packet is ready to be forwarded.

Furthermore, the present invention may be embodied in a packet processing system including a packet memory having a plurality of memory blocks for storing packets, a packet writer operably coupled to store packets in the packet memory a packet processor operably coupled to process packets stored in the packet memory a packet reader operably coupled to forward packets processed by the packet processor, and a memory controller operably coupled to control access to the memory by the packet writer, the packet processor, and the packet reader such that packets written into the packet memory by the packet writer in first-in-first-out order and processed by the packet processor in an order-independent fashion are forwarded by the packet reader in first-in-first out order.

The present invention may be embodied in other specific forms without departing from the essence or essential characteristics. The described embodiments are to be considered in all respects only as illustrative and not restrictive.

It should be noted that the term "communication controller" is used herein as a generic term for a device that processes packets, and should not be construed to limit application of the present invention to a particular device or class of devices. Thus, a communication controller may be any packet processing device including, but not limited to, a bridge, a router, a packet switch, a cell switch, or a frame relay device.

It should also be noted that the term "packet" is used herein as a generic term for a unit of information that is processed by the communication controller, and should not be construed to limit application of the present invention to information format or communication protocol. Thus, a packet may be any unit of information for use with any protocol including, but not limited to, a frame, a packet, a datagram, a user datagram, or a cell.

We claim:

1. In a memory controller, a method for coordinating read and write access to a plurality of memory blocks in a packet memory in order to provide first-in-first-out read access to the packets stored in the packet memory, the method comprising the steps of:

causing the packets to be written into the packet memory in first-in-first-out order;

causing the packets to be processed by a packet processor;

receiving, for each packet, an indication from the packet processor that the packet is ready to be forwarded, wherein the packets may become ready to be forwarded out of order; and causing the packets that become ready to be forwarded to be read from the packet memory in first-in-first-out order, including the step of maintaining a START indicator and a VALID indicator corresponding to each of the plurality of successive memory blocks in the packet memory, wherein the START indicator, when set to a predetermined value, indicates that a packet starts in the corresponding memory block, and wherein the VALID indicator, when set to a predetermined value, indicates that the packet starting in the corresponding memory block is ready to be forwarded.

2. The method of claim 1, wherein the step of causing the packets to be written into the packet memory comprises the steps of:

causing a packet to be written into a number of successive memory blocks; and setting the START indicator corresponding to a first memory block of the number of successive memory blocks after the packet is written into the number of successive memory blocks.

3. The method of claim 2, wherein the step of causing the packets to be written into the packet memory comprises the steps of maintaining a memory write pointer indicating a first available memory block for writing a packet into the packet memory;

causing the packet to be written into the number of successive memory blocks beginning with said first available memory block; and setting the START indicator corresponding to said first available memory block after the packet is written into the number of successive memory blocks beginning with said first available memory block.

4. The method of claim 3, further comprising the step of:

updating the memory write pointer to indicate a next available memory block following the number of successive memory blocks used to store the packet.

5. The method of claim 2, further comprising the step of:

setting the VALID indicator corresponding to the first memory block of the number of successive memory blocks upon receiving the indication from the packet processor that the packet is ready to be forwarded.

6. The method of claim 2, wherein the step of causing the packets to be processed by the packet processor composes:

maintaining a processor poll pointer indicating a first memory block of a first packet to be processed by the packet processor;

receiving from the packet processor a request for a packet; and providing the packet processor with access to said first packet.

7. The method of claim 6, wherein the step of providing the packet processor with access to said first packet comprises the step of:

sending to the packet processor a pointer to the first memory block of the first packet to be processed by the packet processor.

8. The method of claim 7, wherein the step of providing the packet processor with access to said first packet further comprises the step of:

sending a portion of said first packet to the packet processor.

9. The method of claim 6, further comprising the step of:

updating the processor poll pointer to indicate a first memory block of a next packet to be processed by the packet processor.

10. The method of claim 2, wherein the step of causing the packets that become ready to be forwarded to be read from the packet memory comprises:

determining a first packet to be forwarded, wherein said first packet is stored in a number of successive memory blocks beginning with a first memory block;

monitoring the VALID indicator corresponding to the first memory block of the number of successive memory blocks associated with said first packet; and causing said first packet to be read from the packet memory upon detecting that the VALID indicator is set to indicate that the packet is ready to be forwarded.

11. The method of claim 10, wherein the step of determining the first packet to be forwarded comprises the step of:

maintaining a memory read pointer indicating the first memory block of the number of successive memory blocks associated with said first packet.

12. The method of claim 11, further comprising the step of:

updating the memory read pointer to indicate a first memory block associated with a next packet to be forwarded.

13. The method of claim 10, wherein the step of causing said first packet to be read from the packet memory comprises the steps of:

sending a signal to a packet reader indicating that the packet is ready to be forwarded;

receiving from the packet reader an indication that the packet reader is ready to receive the packet; and causing the packet to be read from the packet memory and sent to the packet reader.

14. The method of claim 10, further comprising the step of:

resetting the START indicator and the VALID indicator corresponding to the first memory block of the number of successive memory blocks associated with the forwarded packet.

15. An apparatus for coordinating read and write access to a plurality of memory blocks in a packet memory in order to provide first-in-first-out read access to the packets stored in the packet memory, the apparatus comprising:

status indicator memory including a START indicator and a VALID indicator for each of the plurality of memory blocks in the packet memory, wherein the START indicator, when set to a predetermined value, indicates that a packet starts in the corresponding memory block, and wherein the VALID indicator, when set to a predetermined value, indicates that the packet starting in the corresponding memory block is ready to be forwarded;

packet writer interface logic operably coupled to coordinate the storage of packets by a packet writer into the packet memory and set the START indicator corresponding to a first memory block associated with each packet stored in the packet memory;

packet processor interface logic operably coupled to provide the packets to a packet processor and set the VALID indicator corresponding to a first memory block associated with each packet stored in the packet memory that is ready to be forwarded; and packet reader interface logic operably coupled to monitor the VALID indicator corresponding to a first memory block associated with a first packet to be forwarded and cause said first packet to be forwarded by a packet reader upon detecting that the VALID indicator is set to indicate that said first packet is ready to be forwarded.

16. The apparatus of claim 15, wherein the apparatus further comprises a memory write pointer register for storing a memory write pointer indicating a first memory block for writing a packet into the packet memory, and wherein the packet writer interface logic comprises:

packet storage logic operably coupled to write a packet into a number of successive memory blocks, beginning with the first memory block indicated by the memory write pointer;

status updating logic operably coupled to set the START indicator corresponding to the first memory block indicated by the memory write pointer; and memory write pointer update logic operably coupled to update the memory write pointer to indicate a first memory block of a next available memory block following the number of successive memory blocks.

17. The apparatus of claim 16, wherein the packet writer interface logic comprises:

a command interface operably coupled to receive commands from the packet writer for transferring packet contents into the packet memory;

first command processing logic operably coupled to process a succession of first write commands for writing successive units of packet data into a number of successive memory blocks in the packet memory; and second command processing logic operably coupled to process a second write command for transferring a last unit of packet data into the packet memory and set the START indicator corresponding to the first memory block associated with the packet.

18. The apparatus of claim 15, further comprising a processor poll pointer register for storing a processor poll pointer indicating a first memory block associated with a first packet to be processed by a packet processor, wherein the packet processor interface logic comprises:

packet providing logic operably coupled to provide said first packet to the packet processor; and processor poll pointer update logic operably coupled to update the processor poll pointer to indicate a first memory block associated with a next packet to be processed by the packet processor after providing said first packet to the packet processor.

19. The apparatus of claim 15, wherein the packet processor interface logic comprises:

a packet status receiver operably coupled to receive an indication from the packet processor that a packet beginning at a specified first memory block is ready to be forwarded; and status updating logic operably coupled to set the VALID indicator corresponding to said specified first memory block to indicate that the packet is ready to be forwarded.

20. The apparatus of claim 15, wherein the packet processor interface logic comprises:

a command interface operably coupled to the packet processor for receiving commands from the packet processor and exchanging data between the packet processor interface logic and the packet processor;

poll receiving logic operably coupled to receive from the packet processor over the command interface a poll command requesting a packet for processing; and poll processing logic operably coupled to provide a packet to the packet processor.

21. The apparatus of claim 20, wherein the poll processing logic comprises:

monitoring logic operably coupled to determine whether a first packet is ready to be processed by the packet processor;

positive acknowledgment logic operably coupled to provide said first packet to the packet processor over the command interface, if said first packet is ready to be processed by the packet processor, and negative acknowledgment logic operably coupled to send a negative acknowledgment to the packet processor over the command interface, if said first packet is not ready to be processed by the packet processor.

22. The apparatus of claim 21, wherein the poll processing logic comprises:

the monitoring logic, operably coupled to monitor the START indicator corresponding to a first memory block associated with said first packet;

the positive acknowledgment logic, operably coupled to provide said first packet to the packet processor over the command interface, if the START indicator corresponding to said first memory block associated with said first packet is set to indicate that said first packet is ready to be processed by the packet processor; and the negative acknowledgment logic, operably coupled to send a negative acknowledgment to the packet processor over the command interface, if the START indicator corresponding to said first memory block associated with said first packet is reset to indicate that said first packet is not ready to be processed by the packet processor.

23. The apparatus of claim 15, wherein the packet processor interface logic comprises:

a command interface operably coupled to the packet processor for receiving commands front the packet processor and exchanging data between the packet processor interface logic and the packet processor;

status receiving logic operably coupled to receive from the packet processor over the command interface a valid indicator indicating a first memory block associated with a packet that is ready to be forwarded; and status updating logic operably coupled to set the VALID indicator corresponding to said first memory block.

24. The apparatus of claim 15, further comprising a memory read pointer register for storing a memory read pointer indicating a first memory block for reading a first packet from the packet memory, wherein the packet reader interface logic comprises:

monitoring logic operably coupled to monitor the VALID indicator corresponding to said first memory block indicated by said memory read pointer;

packet forwarding logic operably coupled to forward said first packet upon detecting that the VALID indicator is set to indicate that said first packet is ready to be forwarded;

status updating logic operably coupled to reset the START indicator and the VALID indicator corresponding to said first memory block indicated by said memory mead pointer after forwarding said first packet; and memory read pointer update logic operably coupled to update the memory read pointer to indicate a first memory block of a next packet to be forwarded after forwarding said first packet.

25. The apparatus of claim 24, wherein the packet forwarding logic comprises: signaling logic operably coupled to the packet reader for signaling to the packet reader that said first packet is ready to be forwarded;

a command interface operably coupled to receive commands from the packet reader for reading said first packet from the packet memory;

first command processing logic operably coupled to process a succession of first read commands for reading successive units of packet data from a number of successive memory blocks in the packet memory; and second command processing logic operably coupled to process a second read command for reading a last unit of packet data from the packet memory and reset the START indicator and the VALID indicator corresponding to the first memory block associated with the packet.

26. The apparatus of claim 15, comprising an integrated circuit.

27. The apparatus of claim 15, comprising a programmable logic device.

28. A packet processing system comprising:

a packet memory having a plurality of memory blocks for storing packets;

a packet writer operably coupled to store packets in the packet memory;

a packet processor operably coupled to process packets stored in the packet memory;

a packet reader operably coupled to forward packets processed by the packet processor; and a memory controller operably coupled to control access to the memory by the packet writer, the packet processor, and the packet reader such that packets written into the packet memory by the packet writer in first-in-first-out order and processed by the packet processor in an order-independent fashion are forwarded by the packet reader in first-in-first out order, wherein the memory controller further comprises status indicator memory including a START indicator and a VALID indicator for each of the plurality of memory blocks in the packet memory, wherein the START indicator, when set to a predetermined value, indicates that a packet starts in the corresponding memory block, and wherein the VALID indicator, when set to a predetermined value, indicates that the packet starting in the corresponding memory block is ready to be forwarded.

29. The packet processing system of claim 28, wherein the memory controller comprises:

packet writer interface logic operably coupled to coordinate the storage of packets by the packet writer into the packet memory and set the START indicator corresponding to a first memory block associated with each packet stored in the packet memory;

packet processor interface logic operably coupled to provide the packets to the packet processor and set the VALID indicator corresponding to a first memory block associated with each packet stored in the packet memory that is ready to be forwarded; and packet reader interface logic operably coupled to monitor the VALID indicator corresponding to a first memory block associated with a first packet to be forwarded and cause said first packet to be forwarded by the packet reader upon detecting that the VALID indicator is set to indicate that said first packet is ready to be forwarded.

30. The packet processing system of claim 28, wherein the packet processor comprises a routing processor in a communication controller.

* * * * *